United States Patent
Hufen et al.

(10) Patent No.: US 8,274,183 B2
(45) Date of Patent: Sep. 25, 2012

(54) STATOR FOR A LINEAR MOTOR

(75) Inventors: Michael Hufen, Wuppertal (DE); Axel Richstein, Hagen (DE); Thomas Schüler, Wetter (DE)

(73) Assignee: Dorma GmbH & Co. KG, Ennepetal (DE)

( * ) Notice: Subject to any disclaimer, the term of this patent is extended or adjusted under 35 U.S.C. 154(b) by 270 days.

(21) Appl. No.: 12/733,224

(22) PCT Filed: Jul. 29, 2008

(86) PCT No.: PCT/EP2008/006240
§ 371 (c)(1),
(2), (4) Date: Feb. 16, 2010

(87) PCT Pub. No.: WO2009/021623
PCT Pub. Date: Feb. 19, 2009

(65) Prior Publication Data
US 2010/0141053 A1  Jun. 10, 2010

(30) Foreign Application Priority Data
Aug. 16, 2007  (DE) .......................... 10 2007 038 847

(51) Int. Cl.
*H02K 41/02* (2006.01)
*H02K 11/00* (2006.01)
*H02K 5/22* (2006.01)

(52) U.S. Cl. ................ 310/12.33; 310/12.04; 310/12.19

(58) Field of Classification Search ............... 310/12.01, 310/12.04, 12.19, 12.27, 12.31, 12.33
See application file for complete search history.

(56) References Cited

U.S. PATENT DOCUMENTS

| | | | |
|---|---|---|---|
| 5,825,104 A | | 10/1998 | Kondo |
| 5,831,352 A | * | 11/1998 | Takei .......................... 310/12.21 |
| 6,297,570 B1 | * | 10/2001 | Matscheko ................. 310/12.02 |
| 6,348,746 B1 | * | 2/2002 | Fujisawa et al. ........... 310/12.24 |
| 7,635,929 B2 | * | 12/2009 | Shikayama et al. ....... 310/12.22 |
| 7,939,973 B2 | * | 5/2011 | Sadakane et al. .......... 310/12.23 |
| 2009/0309427 A1 | * | 12/2009 | Menhart .................... 310/12.14 |

FOREIGN PATENT DOCUMENTS

| | | |
|---|---|---|
| EP | 0 959 549 | 11/1999 |
| EP | 0959549 | * 11/1999 |
| EP | 1 122 391 | 8/2001 |
| EP | 1122391 | * 8/2001 |

\* cited by examiner

*Primary Examiner* — Burton Mullins
(74) *Attorney, Agent, or Firm* — Cozen O'Connor

(57) ABSTRACT

A stator for a linear motor is described. The stator has a stator member with a coil arrangement, a connecting member with external terminals, a sensor arrangement having at least one Hall sensor, and terminals for the sensor arrangement, as well as a holding member. The holding member is subdivided into a connecting member insertion portion and a stator member insertion portion and has holding devices for disposing the stator member and the connecting member stationarily, releasably and in an accurate position with regard to each other.

17 Claims, 9 Drawing Sheets

STATOR FOR A LINEAR MOTOR

CROSS REFERENCE TO RELATED APPLICATION

This is a U.S. national stage of application No. PCT/EP2008/006240, filed on Jul. 29, 2008. Priority is claimed on German Application No.: 10 2007 038 847.2, filed Aug. 16, 2007 the content of which is incorporated here by reference.

BACKGROUND OF THE INVENTION

1. Field of the Invention

The invention relates to a stator of a linear motor, in particular for driving sliding doors.

2. Description of the Related Art

Linear drives for sliding door systems are well known. To determine a position of a sliding door leaf driven by a linear drive, Hall sensors, disposed within the stator, are used. Usually, they are incorporated into a coil arrangement of the stator of the respective linear motor.

It is disadvantageous that, at the time of manufacturing the stator, the Hall sensors need to be incorporated into the coil arrangement. This circumstance leads to fact that the Hall sensors can not be tested separately from the coil arrangement. If the coil arrangement is configured as a module and, is molded by a casting compound, a future exchange of defective Hall sensors is not possible. Furthermore, dimensioning the sensitivity of the Hall sensor system needs to be known at the time of manufacturing the coil arrangement. A future adaptation is either not possible or only possible by recalibrating the evaluation circuit, which is expensive.

SUMMARY OF THE INVENTION

An object of the invention is to reduce the shortfalls of the state-of-the-art.

According to one embodiment of the invention, a stator for a linear motor comprises a stator member, which has a coil arrangement, a connecting member which has external terminals, a sensor arrangement with at least one Hall sensor and external terminals for this sensor arrangement, and a holding member for receiving the stator member and the connecting member. The holding member is subdivided into a connecting member insertion portion and a stator member insertion portion. The holding member has holding devices, which allow for a stationary, accurately positioned, and releasable disposition of the stator member and of the connecting member with regard to each other.

The separation into a stator member and a connecting member has the advantage of the stator member being solely responsible for generating the alternating magnetic field. The sensor system is accommodated in the connecting member. The sensor system does not have to be present at the time of manufacturing the stator member. Both members, the stator member and the connecting member, respectively the sensor system can be tested in parallel and separately from each other, i.e. individually, which is in particular advantageous if there are different manufacturers for the stator member and the sensor system.

In addition, it is possible to exchange the sensor system in the event of failure, without having to exchange the entire stator member, representing additional cost advantages.

Furthermore, the inventive stator preferably has at least two attachment portions. The attachment portions are configured such that the stator can be mounted by these portions to a carrying profile, which in turn is or will be attached at a wall or at a ceiling.

Mounting the holding member is realized by fixing means. According to the invention, these fixing means may be formed by clamping screws, which, during screwing, are propped up against an inside wall of a carrying profile, the holding member being propped up against an opposite side at the carrying profile. This provides the possibility to change the position of the stator, even after the stator is installed.

As an alternative, the fixing means may comprise screws, which, during installation, are screwed into a housing of the carrying profile. This provides the possibility to omit the described support for the stator at the carrying profile, and to be able to utilize a holding member, which, at least in the sidewall areas, is less stable, resulting in cost advantages.

According to one embodiment of the invention, the holding member preferably has a separation wall, which effects a subdivision of the holding member into the connecting member insertion portion and the stator member insertion portion and is disposed between the connecting member and the stator member. As an alternative, this separation may be achieved by one of the at least two attachment portions. This separation into two independent portions allows for separately optimizing the holding member with regard to the installation of the connecting member and the stator member.

Preferably, the separation wall comprises lead-throughs for lines, which serve to fix connecting lines which are to be coupled between the connecting member and the stator member. Thereby, the lines are reliably held and a risk of damaging one of the connecting lines is considerably reduced, if not eliminated at all. In addition, this simplifies mounting the inventive stator at the carrying profile because it can be mounted to the carrying profile as a whole.

The holding devices may comprise spring elements by which the stator member is resiliently pressed against a side of the separation wall, respectively of the attachment portion, facing the stator member. This leads to an accurately positioned disposition of the stator member.

As an alternative or in addition, the holding devices may have at least one holding projection, configured in the stator module insertion portion and in a sidewall of the holding member, which projection is disposed to extend from the sidewall in the direction of another opposite sidewall of the holding member. A coil former of the coil arrangement of the stator member has at least one holding recess such that, when inserting the stator member into the stator module insertion portion of the holding member, the at least one holding recess reaches engagement with the at least one holding projection. Thereby, a particular simple installation and an accurately positioned disposition of the stator member are possible.

As an alternative, at least two adjacent coils of the coil arrangement, at least at opposite corners facing each other, may have respectively one sparing. The sparings are configured such that, with the stator member being assembled, they result in the shape of the above described holding recess, and, during insertion into the holding member, reach engagement with a respective holding projection.

This has the advantage that, instead of a recess, a sparing may be provided in the respective corner, for example by a chamfering.

Preferably each coil has one of the described recesses or sparings at the respective same location. This allows for having to produce only one type of coil former, which considerably reduces the cost with regard to the number of required manufacturing tools and thus makes possibly additional production machines redundant.

According to one embodiment of the invention, the separation wall preferably ends below an upper termination of one of the attachment portions. A space is thereby created above the separation wall between sidewall sections of the holding member, respectively between a respective sidewall section and the at least one attachment portion located in the vicinity of the separation wall or integrally configured with it. The space can be used for running cables and/or individual lines across the coil arrangement, for example to a second stator. The space thus forms a cable duct.

According to one embodiment of the invention, the holding devices may comprise holding noses or projections, which are disposed in the connecting member insertion portion of the holding member. The connecting member is clipped between the holding noses, allowing for a very simple installation of the connecting member.

Furthermore, the holding devices may comprise a spring element by which the connecting member is resiliently pressed against a side of the separation wall, respectively of the one attachment portion, facing away from the stator member, which circumstance serves to accurately position the connecting member with regard to the separation wall, respectively the attachment portion.

BRIEF DESCRIPTION OF THE DRAWINGS

Further features and advantages of the invention will result from the following description of preferred embodiments, in which.

DETAILED DESCRIPTION OF THE PREFERRED EMBODIMENTS

Figure 1:
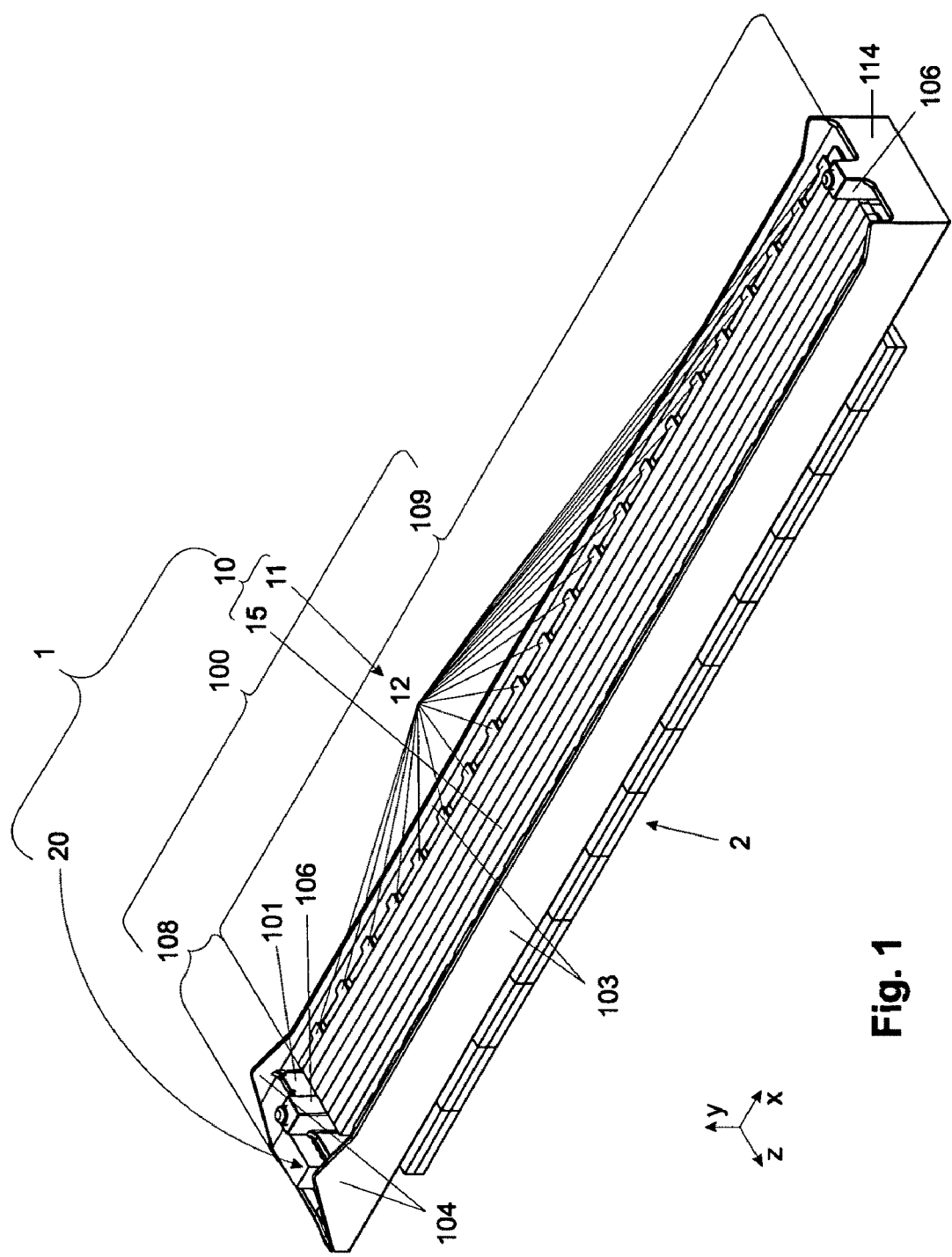
FIG. 1 is a perspective view of a stator according to an embodiment of the invention.

FIG. 1 is a stator 1 according to a first embodiment of the invention together with a rotor 2. The rotor 2 comprises of a row of magnets or is made from magnetizable material. Usually, the rotor 2 is attached at a non-illustrated sliding door leaf.

The stator 1 comprises three parts: a stator member 10, a connecting member 20, and a holding member 100.

The stator member 10 has a coil arrangement 11, which is provided with a magnetic keeper 15 in a known manner. The stator member 10 generates an alternating magnetic field for moving the rotor 2 along a longitudinal extension of the stator member 10. In addition, if desired, it may assume a carrying function, for example with regard to a sliding door leaf to be moved.

The stator member 10 is received in the holding member 100. The holding member 100, seen in a longitudinal direction, i.e. in ±x-direction in FIG. 1, has two portions located one behind the other, a connecting member insertion portion 108 and a stator member insertion portion 109.

As can be seen in FIG. 1, the stator member 10, seen in y-direction, has a magnetic keeper 15 on its rear side, which is preferably composed of laminated core members.

Furthermore, the stator member 10 has a coil former 12, about which non-illustrated windings are wound. Preferably, the coil formers 12 are fitted onto the keeper 15 and more preferably they are molded with it to form a module.

At an end of the holding member 100, remote from the connecting member insertion portion 108, preferably one terminal wall section 114 is disposed, respectively configured.

Furthermore, preferably at least two attachment portions 106 are provided, for mounting the stator 1 at a non-illustrated carrying profile. One of the at least two attachment portions 106 is preferably disposed between the connecting member insertion portion 108 and the stator member insertion portion 109, whereas the second attachment portion is preferably disposed in the vicinity of the terminal wall section 114 and is preferably integrally configured with it.

For the purpose of separating the connecting member insertion portion 108 from the stator member insertion portion 109, preferably a separation wall 101 is provided which extends from a lower portion of the holding member 100 in y-direction and in ±z-direction. The other one of the at least two attachment portions 106 is preferably disposed in the vicinity of the separation wall 101 and is preferably integrally configured with it.

The stator member 10 is inserted into the insertion portion 109 and is supported, preferably resiliently pre-tensioned against a side of the separation wall 101, with respect to the other attachment portion 106, facing the stator member 10. A constant distance to the separation wall 101, with respect to the other attachment portion 106, is achieved. In this case, the separation wall 101 or the other attachment portion 106 preferably serves as a prop-up surface for the stator member 10 and/or for the connecting member 20.

Figure 3A:
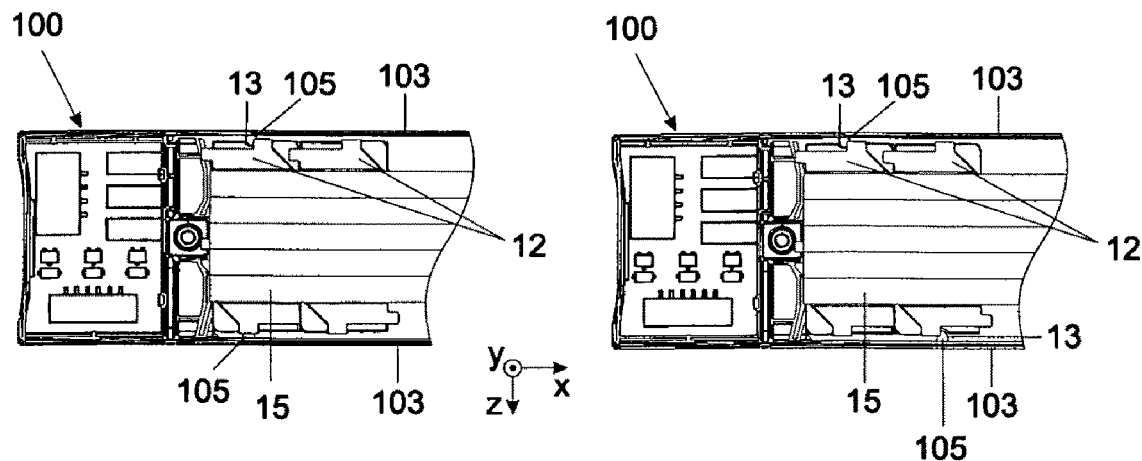
FIGS. 3A-3C are the stator of FIG. 2 in an enlarged section with locking elements according to different embodiments of the invention.
Figure 3B:
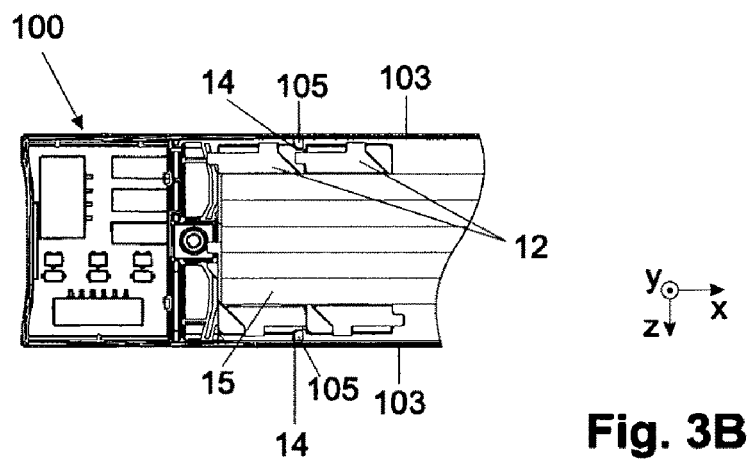
Figure 3C:
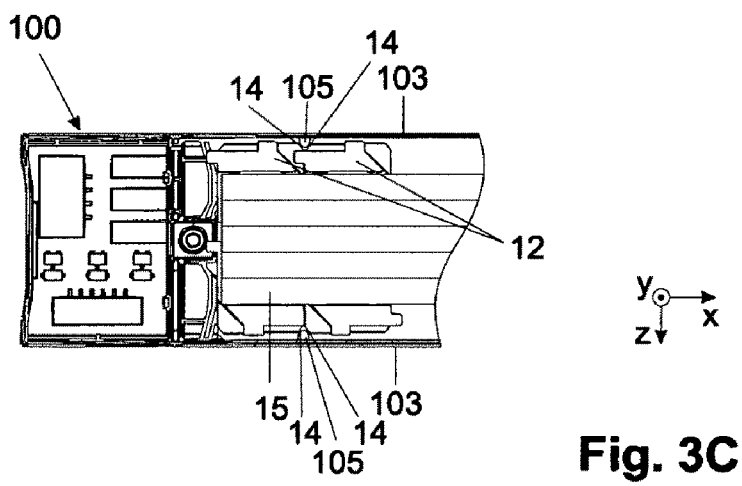

As shown in FIGS. 3a to 3c, positioning the stator member 10 may be achieved by an engagement of at least one coil former 12 of the coil arrangement 11 with at least one sidewall 103 of the holding member 100. For this purpose, at least the one sidewall 103 has a projection 105, for example in the shape of an engagement nose or projection, in an area in which it is disposed adjoining a coil former 12. The adjoining disposed coil former 12 has a preferably complementarily configured recess 13 at a corresponding location. Upon inserting the coil former 12, the at least one projection 105 reaches engagement with the corresponding recess 13.

To improve the stability of the positioning, a similar projection 105 may be configured at the opposite sidewall 103 and a second recess 13 at the corresponding side of the respective coil former 12.

The recesses 13 may likewise be provided at different coil formers 12, as shown on the right side in FIG. 3a. This is advantageous in that respectively only one side of at least two coil formers 12 needs to be provided with a recess 13.

If each coil former 12 is respectively provided with two recesses 13, cost advantages are achieved in that only one type of coil former 12 needs to be manufactured; consequently only one manufacturing tool is required.

According to another alternative shown in FIG. 3b, at a respective corner of a coil former 12, sparing 14 is provided instead of recesses 13. The associated projection 105 is disposed or configured correspondingly offset in the sidewall 103.

According to an alternative shown in FIG. 3c, the respective projection 105 is disposed such that, seen in the z-direction in FIG. 3c, a central line of a respective projection 105 is disposed between edges of two directly adjacent coil formers 12, which edges face each other. The two directly adjacent coil formers 12 have respectively one sparing 14, for example in the shape of a triangle, disposed at the corners, which face each other and are directly adjacent to the projection 105. The sparings 14 form respectively one half of a recess 13. By two directly adjacent coil formers 12, one recess 13 is formed analogously to the one shown in FIG. 3a.

The described projections 105 may be configured to be continuous, when seen in y-direction in FIGS. 3a to 3c, whereby the respective recesses 13, or sparings 14 need to be configured such that, seen in y-direction in FIGS. 3a to 3c, a continuous hollow space exists between coil former 12 and a respective sidewall 103.

The projections 105 are preferably arranged in a lower area of the holding member 100 such that such a continuous hollow space is not required.

In the event the coil former 12 should have some play after being inserted into the holding member 100, there is a risk of the coil former 12 changing its position. An additional non-illustrated pre-tensioning device may be provided such that the stator member 10 is supported resiliently pre-tensioned.

Figure 4:
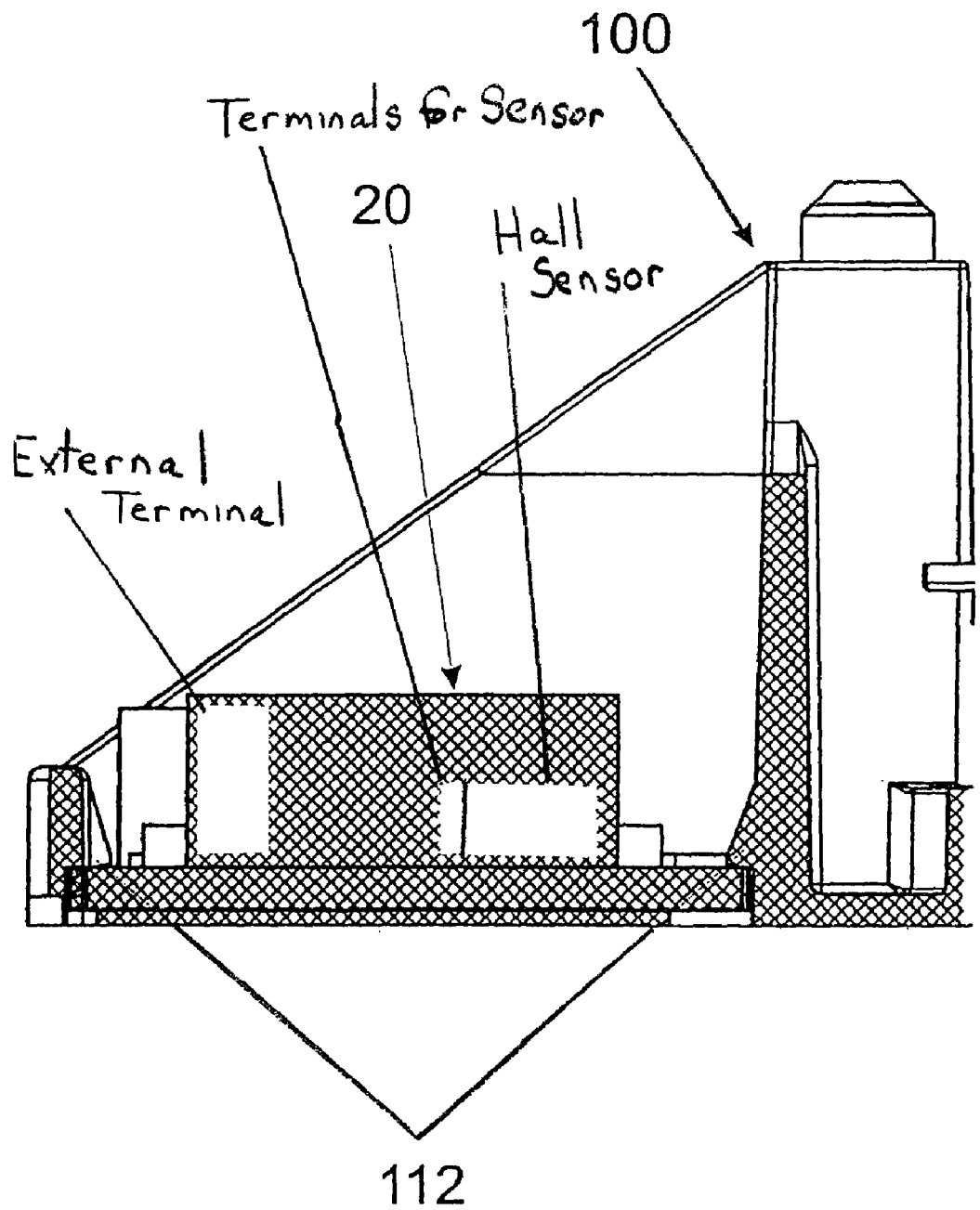
FIG. 4 is a sectional view of a connecting member insertion portion along a line 4-4 of the stator illustrated in FIG. 2.

To position the connecting member 20 with regard to the stator member 10 as precisely as possible, as shown in FIG. 4, an attachment device in the shape of holding noses 112 is provided. The holding projections 112 are disposed in a lower portion of the holding member 100 and are disposed or configured to face each other. The connecting member 20 is clipped into the holding projections or noses 112, which represents a very simple mounting.

In the event there is play between the connecting member 20 and one of the holding noses 112 in the installed condition, analogously to the stator member 10, the connecting member 20 may be likewise supported resiliently pre-tensioned.

The described solution with the projection 105 for the stator member 10 is applicable to the connecting member 20 as well. Usually the connecting member 20 has a circuit board. Accordingly, the circuit board or a respective bottom part of the connecting member 20 has the respective recess(es) 13 or sparing(s) 14.

The described solution with the holding projections 112 for the connecting member 20 is applicable to the stator member 10 as well. In this case, the stator member 10 does not require any recesses 13 or sparings 14. In this case, the sidewalls 103 preferably have holding projections 112, respectively at least two holding projections 112 being disposed or configured preferably at each sidewall 103 and point into the direction of the respective other sidewall 103.

With regard to the spring pre-tensioning, different solutions are indicated by way of example for the stator member 10 in FIG. 5. Analogously they are applicable to the connecting member 20.

Figure 5A:
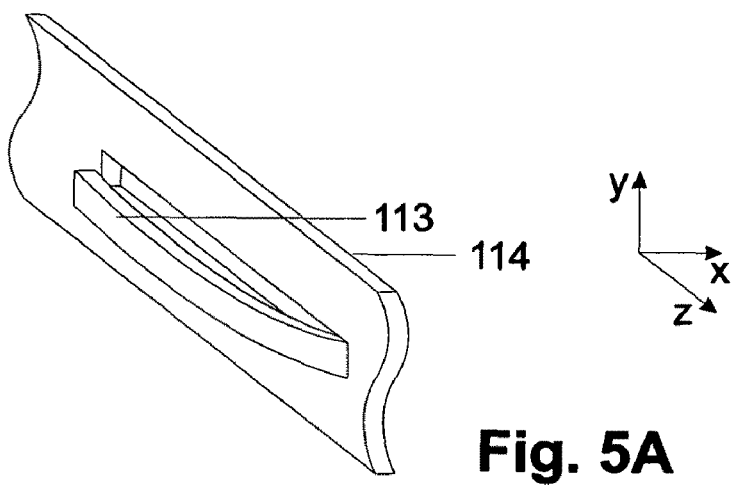
FIGS. 5A-5D are pre-tensioning devices in different embodiments.

As illustrated in FIG. 5A a pre-tensioning device according to a first embodiment of the invention, is formed by a spring projection 113, which is preferably cut out of the wall section 114 or formed therein. It extends in in the −z-direction in FIG. 5A, and its free end protrudes in the −x-direction, i.e. in the direction of the stator member 10, respectively of the connecting member 20.

Figure 5B:
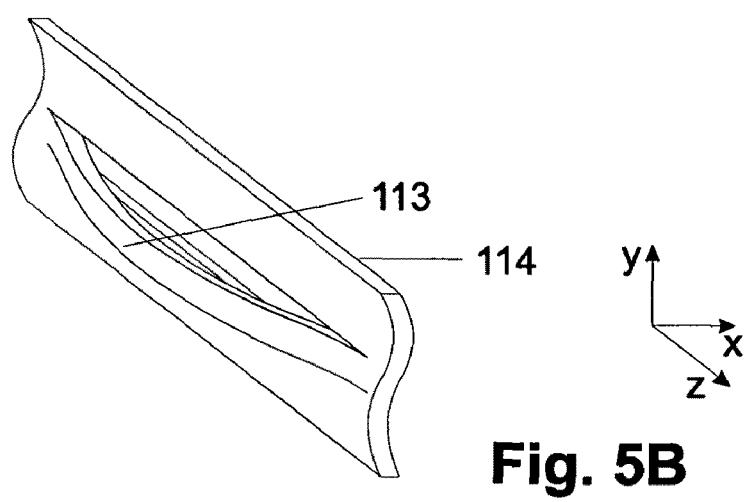
Figure 5C:
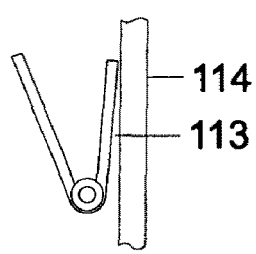

According to a second embodiment shown in FIG. 5B, the pre-tensioning device is likewise formed by means of a spring projection 113' cut out of the wall section 114 of the holding member 100. The spring projection 113' is configured to protrude in a central area into the direction of the stator member 10 or of the connecting member 20. The difference to the embodiment shown in FIG. 5A is that the spring projection 113' has no free end.

Figure 5D:
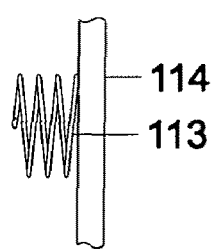

As an alternative, the pre-tensioning device 30 may be formed by a separately configured spring. According to a variant shown in FIG. 5C, it is preferably a spring element 113 configured as a hinge spring. However, it may as well be formed by means of a helical spring, as shown in FIG. 5D, which is propped up at the wall section 114.

Obviously, other spring arrangements are possible as long as they urge the stator member 10, respectively the connecting member 20 into the direction of the respective other member 20, or 10.

Figure 2:
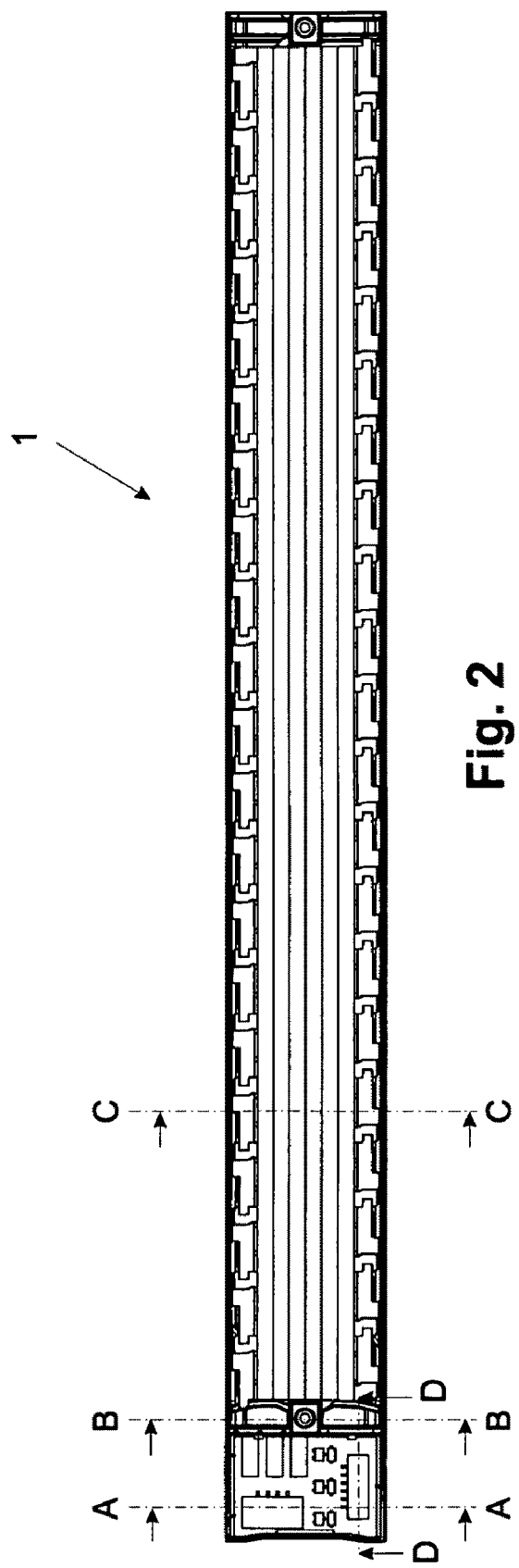
FIG. 2 is a plan view of the stator of FIG. 1 from above.
Figure 6:
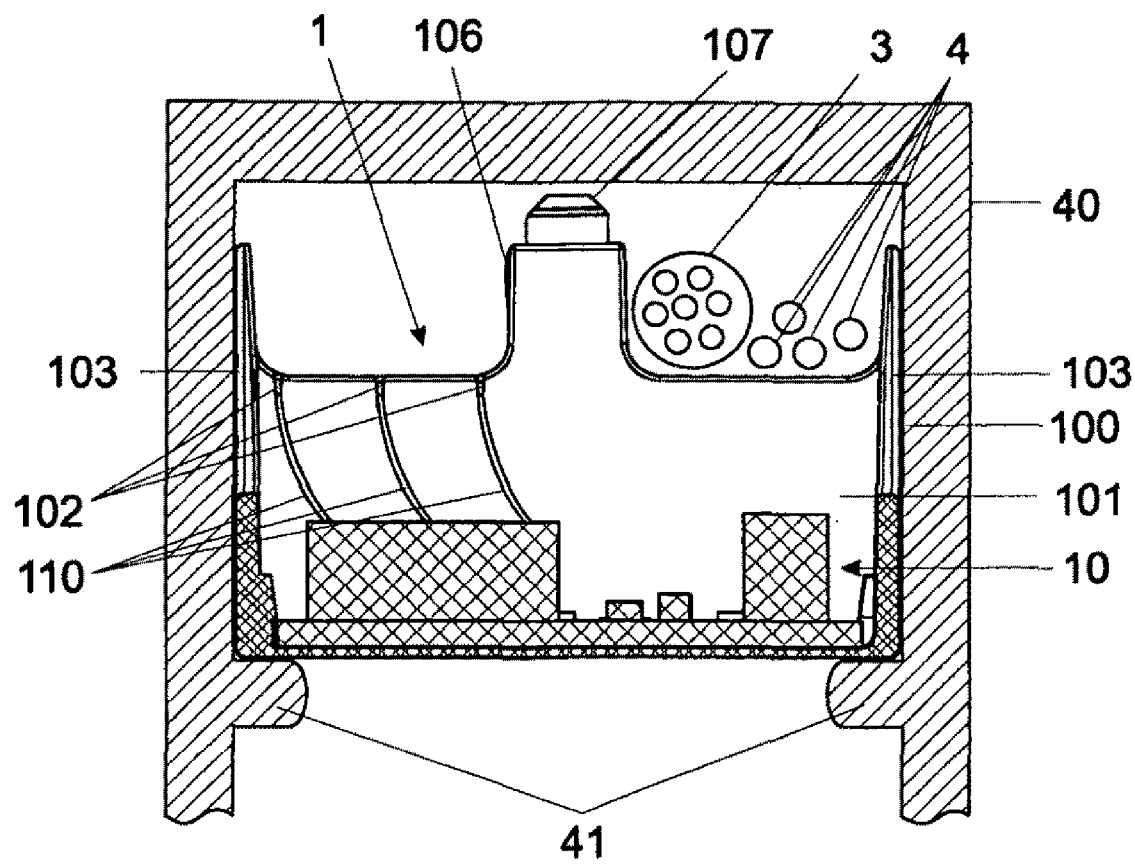
FIG. 6 is a sectional view along a line 6-6 of the stator illustrated in FIG. 2, inserted in a carrying profile.

FIG. 6 shows a sectional view of the stator 1 along the sectional line 6-6 in FIG. 2. As can be seen, the stator 1 is inserted into a carrying profile 40. Only the portion of the carrying profile 40, intended to receive the stator 1 is illustrated. Even if the carrying profile 40 is illustrated as being closed at the top, above the stator 1, it may be configured in any optional way.

As shown in FIG. 6, the stator 1 is simply inserted or introduced into the carrying profile 40 and rests on projections 41, respectively configured on the sides in FIG. 6.

As shown in FIG. 6, the attachment portions 106, and possibly the separation wall 101, respectively the non-illustrated wall section 114, terminate in a central section, preferably above the connecting member 20 and the stator member 10, in this view located behind the separation wall and therefore not visible. If one separation wall 101 and/or one wall section 114 are present, those terminate in areas laterally of the respective attachment portion 106, in FIG. 6 respectively below the attachment portions 106. This means that respectively one hollow space is created in the areas lateral to the attachment portions 106 and lateral to the walls of the carrying profile 40. These areas are preferably provided for allowing to run or install cables 3 or individual lines 4 there through.

This is particularly favourable, if, for example, two stators 1 are to be controlled by the same control circuit. A second application case could be, if power lines and/or data lines are to be run to sensors, such as smoke detectors, hall sensors 200, or the like.

For connecting the stator member 10 to the connecting member 20, in the case of a separation wall 101, lead-throughs 102 for lines are provided in the wall at least in an area lateral to the respective attachment portion. In the simplest configuration, they consist of wedge-shaped slots, into which the respective connecting line 110 is pressed and thus fixed. According to a further embodiment of the invention, the insulation of the respective connecting line 110 is cut in.

As shown in FIG. 6, the sidewalls 103 of the holding member 100 preferably end at a height corresponding to the attachment portions 106, at least in areas corresponding to the respective attachment portion 106. Thus, in conjunction with the keeper of the non-illustrated coil arrangement 11, a reception space in the shape of a cable duct is created for the cables 3 or lines 4. Thereby the cables 3, respectively the lines 4 may be incorporated into the stator 1, i.e. run inside the latter, before the stator is mounted to the carrying profile 40.

Figure 7A:
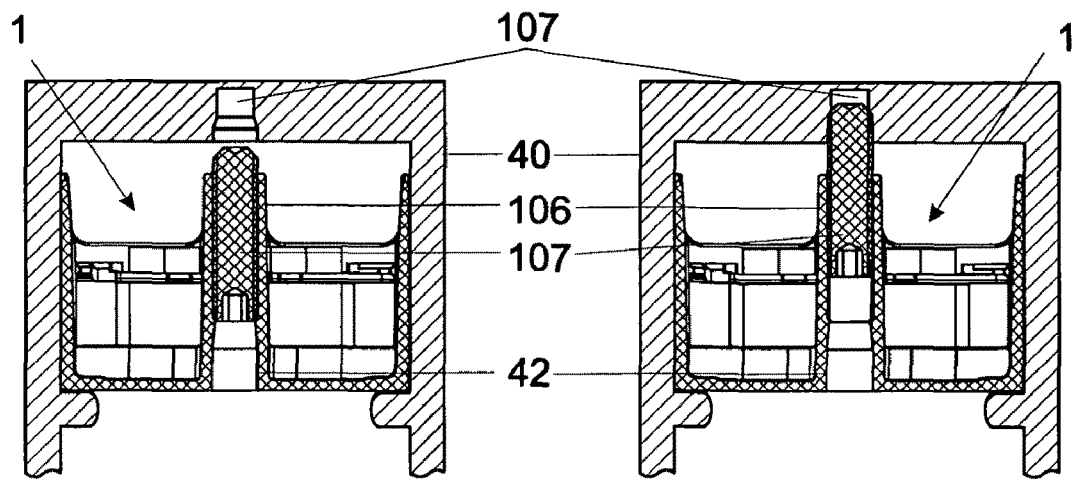
FIGS. 7A and 7B are a sectional views along a line 7-7 of the stator illustrated in FIG. 2 in different embodiments, respectively in two mounting conditions and inserted in a carrying profile.

To stationarily mount the stator 1, according to a first embodiment of the invention shown in FIG. 7A, the preferably two attachment portions 106 have a through-opening 42, which, in FIG. 7A, extends vertically and has a female thread. An attachment screw 107, in this case in the shape of a threaded pin with a hexagon socket, is screwed into the through-opening 42 from the bottom in FIG. 7A. When installing the stator 1, the attachment screw 107 is thus accessible from the bottom.

During installation, a hole 115 is pre-drilled into the carrying profile 40 at a desired location with an interior diameter, which is smaller than or equal to an exterior diameter of a thread of the attachment screw 107.

When mounting the stator 1, upon screwing, the attachment screw 107 cuts into the carrying profile 40, leading to the condition shown on the right hand side in FIG. 7A.

As an alternative, the through-opening 42 in the attachment portion 106 is configured without a thread and has a diameter, which is equal to or slightly larger than an exterior diameter of the thread of the threaded pin 107. At a lower end, i.e. at its head end, the attachment screw 107 preferably has a larger exterior diameter than at its threaded portion, and the through-opening 42 has a larger interior diameter in an area for the head of the attachment screw 107. The attachment screw 107 is thus simply screwed tight in the carrying profile 40, however not in the attachment portion 106.

Any kind of attachment screw, for example a counter-sunk bolt, is useable instead of the threaded pin 107. Furthermore, a clamping can be provided, as long as it offers sufficient reliability for mounting and fixing the stator 1 in the carrying profile 40, in particular during operation with interaction with a rotor 2.

Figure 7B:
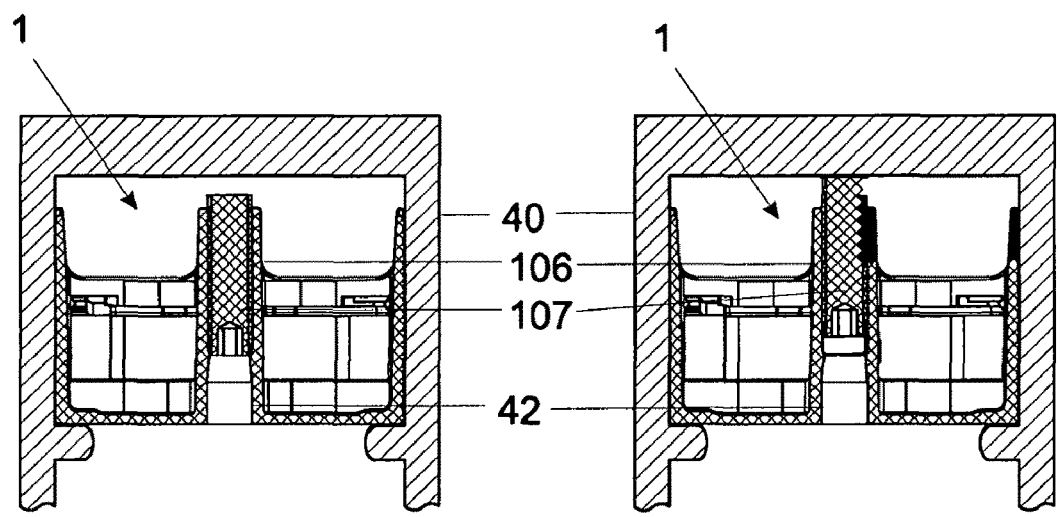

In comparison with the solution illustrated in FIG. 7A, instead of screwing into the carrying profile 40, according to the solution shown in FIG. 7B, it can be intended for the attachment screw 107 to be propped up against an upper interior side of the carrying profile 40. A screwing of the attachment screw 107 results in a clamping of the stator 1 between said upper interior side and holding projections 41 of the carrying profile 40, on which the holding member 100 comes to rest at lower edge areas. This solution is advantageous in that the stator 1 can be mounted and fixed non-destructively (with regard to the carrying profile 40), a circumstance that further simplifies and improves a subsequent displacement of the stator 1. No possible holes, already existing in the carrying profile 40, need to be respected.

Figure 8:
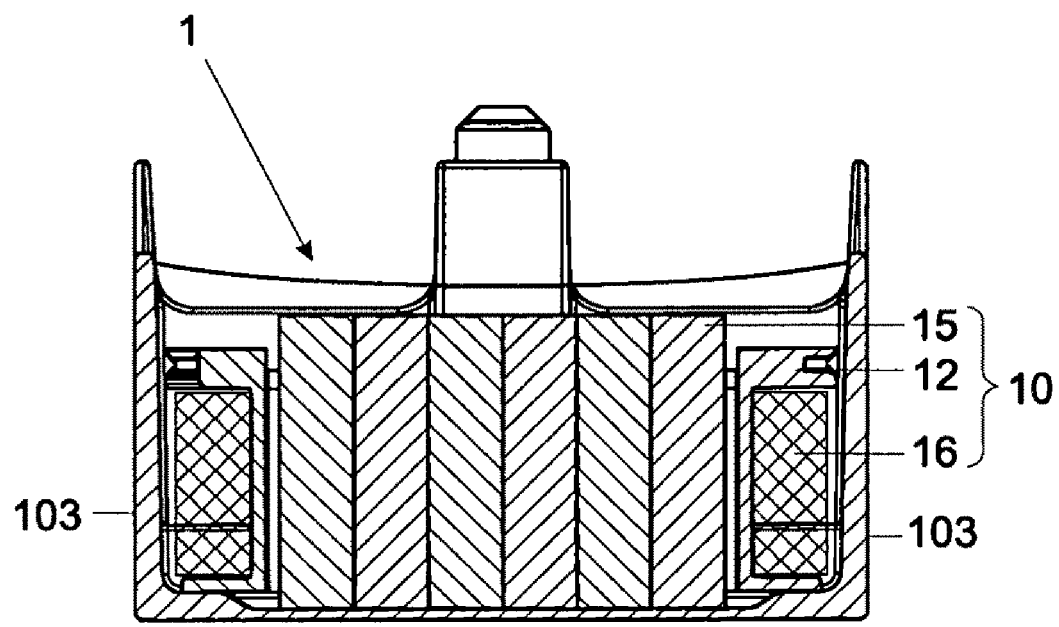
FIG. 8 is a sectional view along a line 8-8 of the stator illustrated in FIG. 2.

FIG. 8 shows a sectional view along a line 8-8 of the stator illustrated in FIG. 2. The coil former 12 comprises a diagrammatically illustrated winding 16, the keeper 15 being essentially centrally disposed in FIG. 8. The sidewalls 103 are preferably configured to have a smaller distance to each other in a lower area than in an area higher up. It is thereby possible to insert the stator member 10 in a simple and tilt-free manner.

Figure 9:
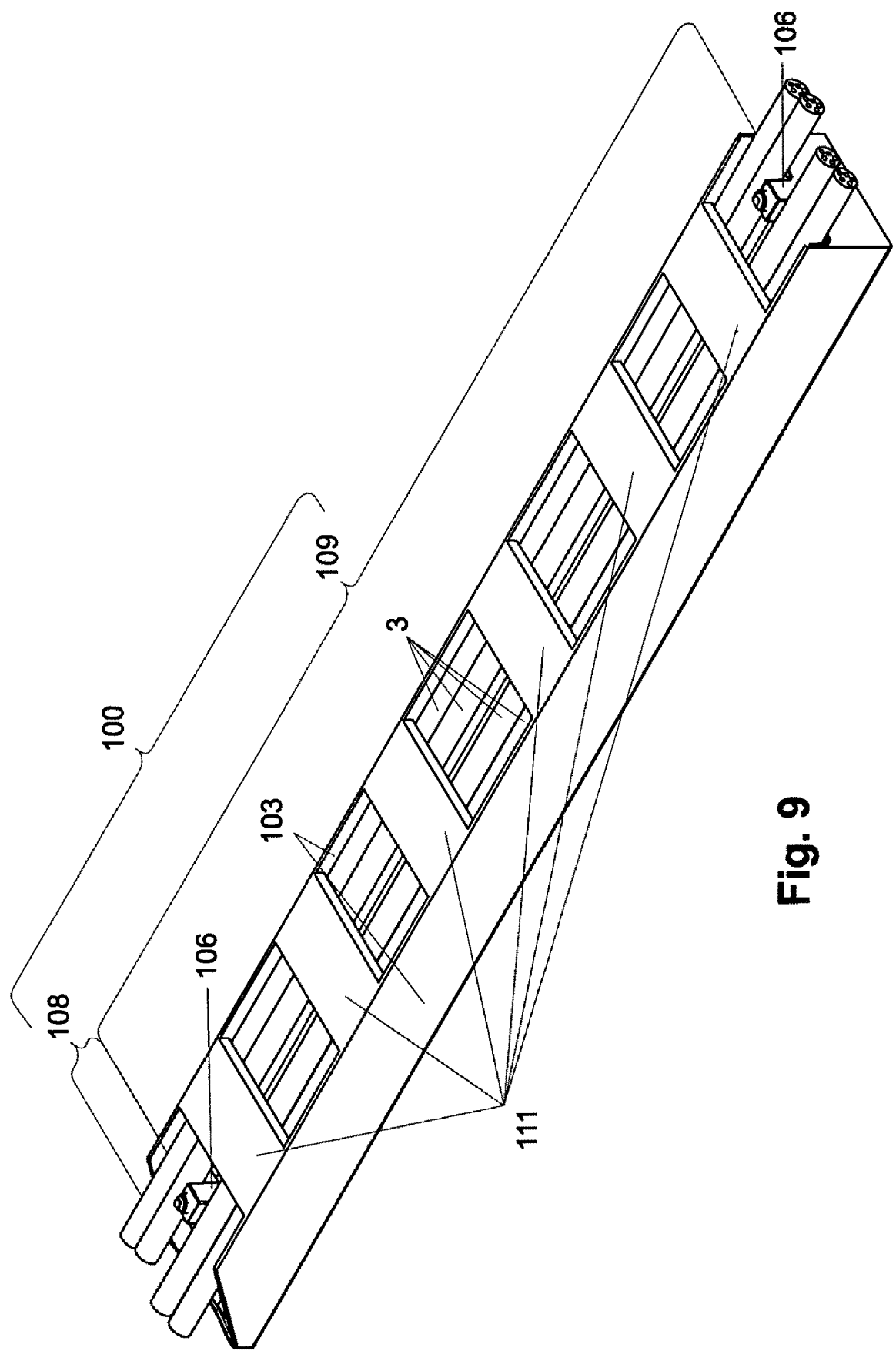
FIG. 9 is a stator with a holding member according to a second embodiment of the invention.

According to a second embodiment of the invention shown in FIG. 9, the holding member 100' has sidewalls 103, which extend over an entire extension of at least the stator member insertion portion 109 and end at the same height, and preferably such like the at least two attachment portions 106. At least in sections, connections in the shape of webs 111 are configured between the sidewalls 103', which webs, on the one hand, impart a higher rigidity to the holding member. On the other hand, they keep possibly installed cables 3 and/or lines 4 on the bottom of the above described reception space, such that, during installing or uninstalling the stator 1 from the carrying profile 40, they do not slip easily out of the carrying profile 40 or are damaged in the process. The webs 111 are preferably configured integrally with the sidewalls 103.

Instead of the webs 111, a complete covering may be provided such that at least the stator member 10 is entirely enclosed. Such a complete covering may be formed by means of a cover part, which is preferably clipped onto the holding member 100.

In addition to sliding door drives, the stator illustrated herein is applicable with linear motors, which are utilized as a drive system for telescopic sliding doors, curved sliding doors, revolving doors, folding leaf doors, and mobile partitioning walls or the like.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A linear motor stator comprising:
a stator member having a coil arrangement;
a connecting member having at least one external terminal;
a sensor arrangement comprising at least one Hall sensor, and terminals for the sensor arrangement; and
a holding member comprising:
a connecting member insertion portion configured to receive the connecting member;
a stator member insertion portion configured to receive the stator member;
a plurality of holding devices configured to releasably retain the stator member and the connecting member in an accurate position with regard to each other; and
at least two attachment portions configured to affix the stator to a carrying profile of the holding member, wherein the attachment portions extend in a direction leading away from a rotor, the rotor corresponding to the stator member, each attachment portion having a respective fixing device.

2. The linear motor stator according to claim 1, wherein the fixing device comprises at least one clamping screw.

3. The linear motor stator according to claim 1, wherein the fixing device comprises at least one screw, which, during an installation, is screwed into the carrying profile.

4. A linear motor stator, comprising:
a stator member having a coil arrangement;
a connecting member having at least one external terminal;
a sensor arrangement comprising at least one Hall sensor, and terminals for the sensor arrangement; and
a holding member comprising:
a connecting member insertion portion configured to receive the connecting member;
a stator member insertion portion configured to receive the stator member;
a plurality of holding devices configured to releasably retain the stator member and the connecting member in an accurate position with regard to each other; and a separation wall configured to provide the subdivision of the holding member, the separation wall disposed at the holding member between the connecting member and the stator member.

5. The linear motor stator according to claim 4, wherein the separation wall terminates below an upper termination of the at least two attachment portions.

6. The linear motor stator according 4, wherein the separation wall comprises a horizontally and centrally disposed section, which extends in a direction away from a rotor,
wherein the holding member comprises at least one sidewall section at least in an area of the separation wall disposed in the direction away from the rotor and extends essentially perpendicularly with regard to the separation wall,
whereby a reception space is formed between the section of the separation wall and the at least one sidewall section.

7. The linear motor stator according to claim 4, wherein the holding devices comprise spring elements configured to resiliently press the stator member against a side of the separation wall facing the stator member.

8. The linear motor stator according to one of the claims 4, wherein the separation wall comprises lead-throughs for a plurality of lines configured to couple the connecting member and the stator member.

9. The linear motor stator according to claim 8, wherein the lead-throughs are formed by chases into which a respective one of the plural lines is clamped.

10. The linear motor stator according to claim 4, wherein at least two attachment portions are arranged to provide the subdivision of the holding member, at least one of the attachment portions being arranged between the connecting member and the stator member.

11. The linear motor stator according to claim 10, wherein the holding devices comprise spring elements configured to resiliently press the stator member against the one attachment portion.

12. The linear motor stator according to claim 11, wherein the holding devices comprise at least one holding projection arranged in the stator member insertion portion and in a sidewall of the holding member, the holding devices disposed to extend from the sidewall in the direction of another opposite sidewall of the holding member,
wherein at least one coil former of a coil arrangement of the stator arrangement has a holding recess such that, during insertion of the stator member into the stator member insertion portion of the holding member the at least one holding recess engages with the at least one holding projection.

13. The linear motor stator according to claim 11, wherein the holding recess is formed by a recess in the at least one coil former of the coil arrangement disposed directly adjacent to the at least one holding recess.

14. The linear motor stator according to claim 11, wherein the holding recess is formed by means of two sparings of two adjacent coils of the coil arrangement, the sparings arranged at respective corners which are located opposite each other and face each other.

15. The linear motor stator according to claim 14, wherein the sparings are configured at each coil former of the coil arrangement.

16. A linear motor stator comprising:
a stator member having a coil arrangement;
a connecting member having at least one external terminal;
a sensor arrangement comprising at least one Hall sensor, and terminals for the sensor arrangement; and
a holding member comprising:
a connecting member insertion portion configured to receive the connecting member;
a stator member insertion portion configured to receive the stator member; and
a plurality of holding devices configured to releasably retain the stator member and the connecting member in an accurate position with regard to each other,
wherein the holding devices comprise holding projections between which the connecting member is clipped.

17. The linear motor stator according to claim 16, wherein the holding devices further comprise a spring element by which the connecting member is resiliently pressed against one of a side of a separation wall facing the connecting member and an attachment portion.

* * * * *